United States Patent
Minaux et al.

(10) Patent No.: US 6,706,832 B2
(45) Date of Patent: Mar. 16, 2004

(54) PROCESS FOR THE CONTROLLED RADICAL POLYMERIZATION OR COPOLYMERIZATION OF ETHYLENE UNDER HIGH PRESSURE IN THE PRESENCE OF INITIATING FREE RADICALS AND OF CONTROLLING INDOLINE NITROXIDE RADICALS

(75) Inventors: Eric Minaux, Epinal (FR); Lucedio Greci, Felino (IT); Michael Buback, Eddigehausen (DE); Paul Tordo, Marseilles (FR); Thierry Senninger, Hayange (FR); Pierluigi Stipa, Ancona (IT); Patricia Carloni, Ancona (IT); Elisabetta Damiani, Cagli (IT); Giampaolo Tommasi, Ancona (IT)

(73) Assignee: Atofina (FR)

( * ) Notice: Subject to any disclaimer, the term of this patent is extended or adjusted under 35 U.S.C. 154(b) by 0 days.

(21) Appl. No.: 10/351,904

(22) Filed: Jan. 27, 2003

(65) Prior Publication Data

US 2003/0149204 A1 Aug. 7, 2003

Related U.S. Application Data

(62) Division of application No. 09/767,988, filed on Jan. 23, 2001, now Pat. No. 6,531,556.

(30) Foreign Application Priority Data

Jan. 26, 2000 (FR) .............................. 00 00990

(51) Int. Cl.$^7$ .......................... C08F 2/38; C08F 110/02

(52) U.S. Cl. ...................... 526/220; 526/352; 526/348; 526/204; 526/184; 526/227

(58) Field of Search ................... 526/352, 348, 526/220, 204, 184, 227

(56) References Cited

U.S. PATENT DOCUMENTS

| | | | | |
|---|---|---|---|---|
| 4,581,429 A | * | 4/1986 | Solomon et al. ............ | 526/220 |
| 5,449,724 A | * | 9/1995 | Moffat et al. ............... | 526/204 |
| 5,552,502 A | * | 9/1996 | Odell et al. ................. | 526/234 |
| 5,872,252 A | * | 2/1999 | Sutoris et al. .............. | 544/194 |
| 6,531,556 B2 | | 3/2003 | Minaux et al. | |

FOREIGN PATENT DOCUMENTS

WO   WO 00/20469   * 4/2000

OTHER PUBLICATIONS

Carloni et al., Electron–transfer Reactions. Oxidation of Grignard Reagents in the Presence of an Aminoxyl as a Radical–Tapping Agent, J.Org. Chem., 56, 4733–4737 (1991).*
Stipa et al., Synthesis and thermal stability of alkixyamines, Polym. Degrad. Stab., 55, 323–327 (1997).*
Berti et al., Competition between single electron transfer and nucleophilic attach: reaction of 3–arylimino–2–phenyl–3H–indoles with organolithium compounds, J.Chem. Soc. Perkin II, 8, 1032–5(1977).*
Berti et al., Stable nitroxide radicals from phenylisatogen and arylimino derivatives with organometallic compounds, Tetrahedron, 31(15), 1745–53 (1975).*
Carloni et al., *Electron–Transfer Reactions. Oxidation of Grignard Reagents in the Presence of Aminoxyl as a Radical–Tapping Agent*, J. Org. Chem. 1991, 56, 4733–4737.
Stipa et al., *Synthesis and thermal stability of alkoxyamines*, Polym. Degrad. Stab. 10997, 55, 323–327.
Berti et al., *Stable nitroxide radicals from phenylisatogen and arylimino derivatives with organometallic compounds*, Tetrahedron (1975), 31(15), 1745–53.
Berti et al., *Competition between single electron transfer and nucleophiliic attach: reaction of 3–arylimino–2–phenyl–3H–indoles with oragnolithium compounds*, J. Shem. Soc. Perkins Trans. 2(1977), (8), 1032–5.
French Preliminary Search Report dated Sep. 14, 2000.

* cited by examiner

Primary Examiner—Ling-Siu Choi
(74) Attorney, Agent, or Firm—Jones Day

(57) ABSTRACT

Polymers are obtained by a radical (co)polymerization of ethylene under high pressure in the presence of at least one initiating free radical (Z*) and of at least one controlling stable free radical (SFR*) which comprises the indoline nitroxide backbone represented by the formula (I).

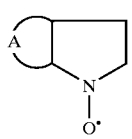

(I)

A is a hydrocarbonaceous chain forming an aromatic ring with the two carbon atoms to which it is attached, this ring being able to carry substituents or being able to carry one or more rings placed side by side, which rings are aromatic or aliphatic and optionally substituted, the carbon atoms forming the nitrogenous ring and in the alpha- and beta-position with respect to the nitrogen atom being, able to carry hydrogen atoms or substituents.

3 Claims, No Drawings

PROCESS FOR THE CONTROLLED RADICAL POLYMERIZATION OR COPOLYMERIZATION OF ETHYLENE UNDER HIGH PRESSURE IN THE PRESENCE OF INITIATING FREE RADICALS AND OF CONTROLLING INDOLINE NITROXIDE RADICALS

This is a division of application Ser. No. 09/767/988 filed on Jan. 23, 2001 now U.S. Pat. No. 6,531,556.

The present invention relates to a process for the controlled radical polymerization or copolymerization of ethylene under high pressure in the presence both:
- of initiating free radicals resulting from initiating compounds; and
- of controlling stable free radicals composed of indoline nitroxides, it being possible for these two types of radicals also to result from the same initiating-controlling compound, as will be described hereinbelow.

The polymerization under high pressure of ethylene or its copolymerization under high pressure with comonomers which can copolymerize by the radical route results in a large variety of products which have numerous applications, among which may be mentioned bases for adhesives, in particular hot melt adhesives, bituminous binders, wrapping films, impact strengtheners, coextrusion binders, moulded items, and the like.

Processes for the polymerization of ethylene at high temperatures and pressures by means of initiating free radicals have been known for a long time. Ethylene polymers are obtained by homopolymerizing ethylene or by copolymerizing it with at least one other comonomer in a polymerization system which operates continuously under pressures of the order of 50 MPa to 500 MPa and at temperatures of between 50 and 300° C. The polymerization is carried out in continuous tubular reactors or stirred autoclaves in the presence of initiators and optionally of transfer agents. The polymers are subsequently separated from the volatile substances after their departure from the reactor in separators.

It is known that the polymerization of ethylene in the presence or in the absence of comonomers can result in reaction runaways (see, for example, Chem. Eng. Proc., 1998, 37, 55–59). These runaways are reflected by a very marked rise in the temperature and in the pressure and thus by bursting of the safety devices of the plant. Consequently, the runaway must result in undesired shutdowns in production. The aim is thus to avoid these shutdowns as far as possible and one means for doing this is to carefully control the flow rates of the reactants entering the reactor, in particular the flow rate of the source of radicals, that is to say of the initiator. This is because the injection of an excessively large amount of radicals results in a localized runaway in one of the regions of the reactor, which runaway subsequently spreads very quickly to the whole of the reactor. There thus exists a content of radicals not to be exceeded in order not to result in the runaway of the polymerization.

However, it is generally known that radical polymerizations can be controlled using stable free radicals, this control making it possible in particular to obtain polymers exhibiting narrow molecular mass distributions. Thus it is that U.S. Pat. No. 5,449,724 discloses a radical polymerization process which consists in heating, at a temperature of approximately 40° C. to approximately 500° C. and under a pressure of approximately 50 MPa to 500 MPa, a mixture composed of a free radical initiator, of a stable free radical (conventionally described nitroxides, such as 2,2,6,6-tetramethyl-1-piperidinyloxy (TEMPO) and its derivatives) and of ethylene, in order to form a thermoplastic resin which has a molecular mass distribution of approximately 1.0 to approximately 2.0.

In seeking to improve the known process for the controlled radical (co)polymerization of ethylene under high pressure, the Applicant Company has now discovered that, if (co)polymerization involves the participation of a conventional radical initiator and, as agent for controlling radical (co)polymerization, a specific nitroxide not disclosed in U.S. Pat. No. 5,449,724 and, in a specific embodiment, an initiator-controller capable of providing at least one initiating radical and at least one stable free radical (stable under the specific temperature conditions deployed in this high pressure (co)polymerization), this (co)polymerization is controlled under particularly favourable conditions while also controlling the reaction stability, an advantage of indoline nitroxides being their high thermal stability, which is important for high pressure processes where the temperatures are generally high.

It was therefore not obvious to thus control the high pressure (co)polymerization of ethylene, with greater effectiveness than with the use of an initiator and of a conventional stable free radical and with the observation, also surprising, that the (co)polymerization of ethylene takes place with a markedly greater rate. Furthermore, with the process of the invention, there is no limitation on the molecular masses of the (co)polymers obtained.

In addition, another consequence of the present invention is that, in the case where the initiator or the initiator-controller chosen is such that it provides an initiating free macroradical, block copolymers are produced in which at least one of the blocks comprises ethylene as constituent. In point of fact, ethylene copolymers prepared under high pressure currently have random structures and it has not been possible to date to obtain such block copolymers having an ethylene-based block. It is well known that the structure of block copolymers can result in markedly better physicochemical properties than random copolymers. The present invention thus makes it possible to achieve the production of novel materials having novel properties.

It may be indicated that U.S. Pat. No. 5,872,252 discloses a process for the compression of ethylene monomers, such as ethylene, under a pressure of 20–500 MPa in the absence of a radical polymerization initiator and in the presence of a sterically hindered amine derivative, which can be an N-oxy derivative (stable free radical). Apart from the fact that this process is not a polymerization process, it may be emphasized that the stable free radicals of the present invention, comprising an indoline nitroxide nucleus, are not at all envisaged in this U.S. Pat. No. 5,872,252.

A subject-matter of the present invention is thus firstly a process for the radical polymerization or copolymerization of ethylene under high pressure and in the presence of at least one initiating free radical (Z*) and of at least one controlling stable free radical (SFR*) which comprises the indoline nitroxide backbone represented by the formula (I):

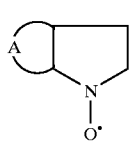

in which A is a hydrocarbonaceous chain forming an aromatic ring with the two carbon atoms to which it is attached, this ring being able to carry substituents or being able to carry one or more rings placed side by side, which rings are aromatic or aliphatic and optionally substituted, the carbon atoms forming the nitrogenous ring and in the alpha- and beta-position with respect to the nitrogen atom being able to carry hydrogen atoms or substituents.

In particular, the controlling stable free radical or radicals (SFR*) are chosen from those which exhibit a decomposition of less than 90%, preferably of less than 95%, after 6 hours at 200° C. in diphenyl ether.

The present invention thus involves the formation of a stable free radical. A stable free radical should not be confused with free radicals with a fleeting lifetime (a few milliseconds), such as the free radicals resulting from the usual polymerization initiators, such as peroxides, hydroperoxides and initiators of the azo type. The free radicals which initiate polymerization tend to accelerate the polymerization. In contrast, stable free radicals generally tend to slow down the polymerization. It may be generally said that a free radical is stable within the meaning of the present invention if it is not a polymerization initiator and if, under the operating conditions of the present invention, the mean lifetime of the radical is at least five minutes. During this mean lifetime, the molecules of the stable free radical continually alternate between the radical state and the state of a group bonded to a polymer chain via a covalent bond resulting from a coupling reaction between a radical centered on an oxygen atom and a radical centered on a carbon atom. Of course, it is preferable for the stable free radical to exhibit good stability throughout the duration of its use in the context of the present invention. Generally, a stable free radical can be isolated in the radical state at ambient temperature.

In accordance with a particularly advantageous embodiment of the present invention, the controlling stable free radical or radicals (SFR*) are chosen from those represented by the formula (II):

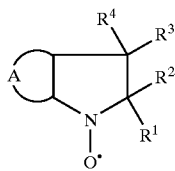

(II)

in which:

$R^1$, $R^2$, $R^3$ and $R^4$, which can be identical or different, each independently represent hydrogen; alkyl; alkenyl; aryl; aralkyl; OH; —$OR^5$ with $R^5$ representing an alkyl, alkenyl, aryl or aralkyl residue; —COOH; —$COOR^6$ with $R^6$ representing an alkyl, alkenyl, aryl or aralkyl residue; or CN; it being possible for $R^3$ and $R^4$ to merge together into =X, X representing O or =$NR^7$ with $R^7$ representing an alkyl, alkenyl, aryl or aralkyl residue; and it being possible for the alkyl, alkenyl, aryl or aralkyl residues coming within the definition of $R^1$ to $R^6$ to carry substituents; and A is as defined above.

More particularly:

at least one of the radicals from $R^1$ and $R^2$ has a molar mass of greater than 15; and/or $R^3$ and $R^4$ merge together into =X, X being as defined above; and/or $R^1$ represents an aryl residue, such as phenyl or mesityl; and $R^2$ represents a $C_1$–$C_4$ alkyl residue, such as methyl, ethyl, i-propyl or n-butyl; an aryl residue, such as phenyl; a benzyl residue or an allyl residue.

Mention may be made of the specific family of compounds (II) represented by the formula (IIa):

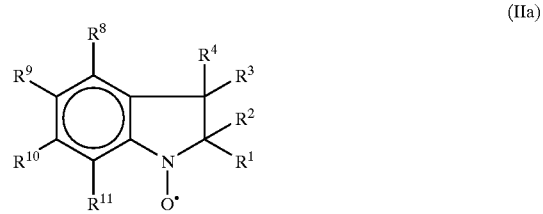

(IIa)

in which:

$R^1$, $R^2$, $R^3$ and $R^4$ are as defined above; and $R^8$ to $R^{11}$, which are identical or different, each independently represent hydrogen or a radical as indicated above for $R^1$ to $R^4$; it being possible for $R^8$ and $R^9$ or $R^9$ and $R^{10}$ or $R^{10}$ and $R^{11}$ to be connected to one another to form an aliphatic or aromatic ring.

Mention may be made, among this specific family (IIa), of the compounds in which $R^8$ to $R^{11}$ represent hydrogen, it furthermore being possible for at least one of them to be substituted by methyl (for example, the case where A is a mesityl group residue). Mention may in particular be made of 1,2-dihydro-2,2-diphenyl-3-phenylamino-3H-indole N-oxyl.

Mention may also be made, among this specific family (IIa), of the compounds of formulae (IIa$_1$) to (IIa$_4$):

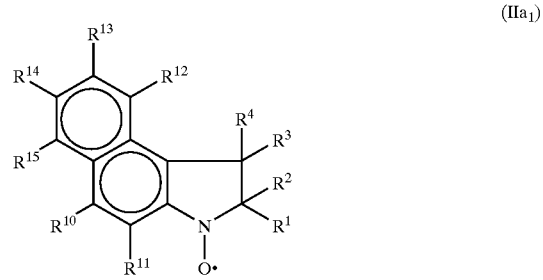

(IIa$_1$)

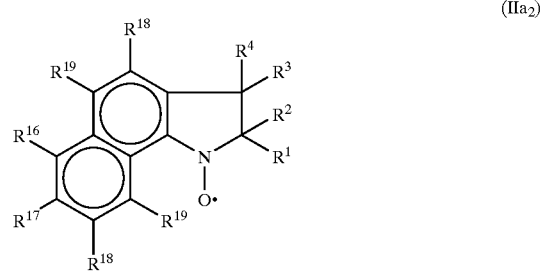

(IIa$_2$)

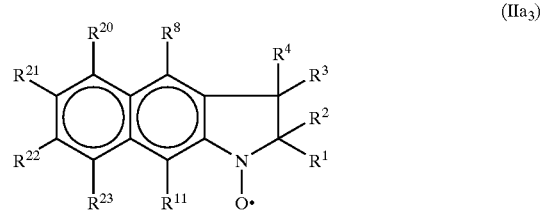

(IIa$_3$)

-continued

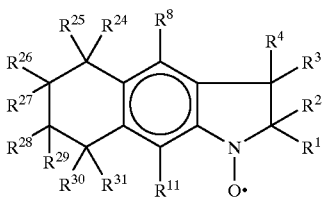
(IIa4)

in which:

R$^1$, R$^2$, R$^3$ and R$^4$ are as defined above; and

R$^8$ and R$^{10}$ to R$^{31}$ each independently represent hydrogen or a radical as indicated above for R$^1$ to R$^4$.

The chain A of the nucleus of the formula (I) can also form part of a polycyclic hydrocarbon residue, such as anthracene.

The initiating free radical or radicals (Z*) conventionally result from a compound chosen from diacyl peroxides, peroxyesters, dialkyl peroxides, peroxyketals, dicumyl peroxide, cumyl tert-butyl peroxide, hydroperoxides and peroxydicarbonates.

Mention may be made, as examples of diacyl peroxides, of benzoyl peroxide, lauroyl peroxide, decanoyl peroxide, 3,5,5-trimethylhexanoyl peroxide, and acetyl cyclohexylsulphonyl peroxide.

The following may be indicated as examples of peroxyesters:

tert-butyl peroxybenzoate;
tert-butyl peroxyacetate;
tert-butyl peroxy-3,5,5-trimethylhexanoate;
tert-amyl peroxy-3,5,5-trimethylhexanoate;
2,5-dimethyl-2,5-di(benzoylperoxy)hexane;
00-tert-butyl 0-isopropyl monoperoxycarbonate;
00-tert-butyl 0-(2-ethylhexyl) monoperoxycarbonate;
00-tert-amyl 0-(2-ethylhexyl) monoperoxycarbonate;
tert-butyl peroxyisobutyrate;
tert-butyl peroxy-2-ethylhexanoate;
tert-amyl peroxy-2-ethylhexanoate;
2,5-dimethyl-2,5-di(2-ethylhexanoylperoxy)hexane;
tert-butyl peroxypivalate;
tert-amyl peroxypivalate;
tert-butyl peroxyneodecanoate;
tert-butyl peroxyisononanoate;
tert-amyl peroxyneodecanoate;
α-cumyl peroxyneodecanoate;
3-hydroxy-1,1-dimethylbutyl peroxyneodecanoate; and
tert-butyl peroxymaleate.

Mention may be made, as examples of dialkyl peroxides, of:

2,5-dimethyl-2,5-di(tert-butylperoxy)hex-3-yne;
di-tert-butyl peroxide;
di-tert-amyl peroxide;
1,3-di(tert-butylperoxyisopropyl)benzene;
2,5-dimethyl-2,5-di(tert-butylperoxy)hexyne;
1,1,4,4,7,7-hexamethylcyclo-4,7-diperoxynonane;
3,3,6,6,9,9-hexamethylcyclo-1,2,4,5-tetraoxanonane.

Mention may be made, as examples of peroxyketals, of:

1,1-di(tert-butylperoxy)cyclohexane;
1,1-di(tert-butylperoxy)-3,3,5-trimethylcyclo-hexane;
ethyl 3,3-di(tert-butylperoxy)butyrate;
ethyl 3,3-di(tert-amylperoxy)butyrate;
n-butyl 4,4-di(tert-butylperoxy)valerate;
2,2-di(tert-butylperoxy)butane;
1,1-di(tert-amylperoxy)cyclohexane; and
2,2-bis[4,4-di(tert-butylperoxy)cyclohexyl]propane.

Mention may be -made, as examples of hydroperoxides, of:

tert-butyl hydroperoxide;
tert-amyl hydroperoxide;
cumyl hydroperoxide;
2,5-dimethyl-2,5-di(hydroperoxy)hexane;
diisopropylbenzene monohydroperoxide; and
paramenthane hydroperoxide.

Mention may be made, as examples of peroxydicarbonates, of:

di(2-ethylhexyl) peroxydicarbonate; and
dicyclohexyl peroxydicarbonate.

The ratio of the compound which provides the above-mentioned initiating free radicals (diacyl peroxides, and the like) (Z*)/monomer(s) can be within the range from 0.0005% to 20% by weight, preferably from 0.0005% to 10% by weight, more preferably from 0.0005% to 5% by weight; the ratio of the compound with a controlling indoline nitroxide group (SFR*)/monomers can be within the range from 0.0005% to 15% by weight, preferably from 0.0005% to 5% by weight; the molar ratio of the controlling indoline nitroxide radicals (SFR*) to the initiating free radicals (Z*) is in particular between 0.1 and 10, especially between 0.5 and 5, more preferably between 0.8 and 12.

In accordance with a particularly advantageous embodiment of the present invention, the initiating free radical or radicals result from at least one polymerization initiating-controlling compound capable of providing, by decomposition under the polymerization or copolymerization conditions:

a monofunctional initiating free radical (Z*); and
a stable free radical (SFR*) as defined above, which is stable under the (co)polymerization conditions.

In other words, when the initiator-controller dissociates, it produces, in the medium, an initiating free radical and a stable free radical, the two radicals being monofunctional. Examples of initiator-controllers are shown below.

The growing (co)polymer is thus positioned between the "initiating" part and the "controlling" part constituted by the stable free radical (SFR*).

In accordance with a first alternative form, the choice is made, as initiating-controlling compound, of a compound capable of providing at least one monofunctional radical (Z*) chosen from those of the formulae (IIIa), (IIIb) or (IIIc):

(IIIa)

(IIIb)

-continued

(IIIc)

in which:

$R^{32}$, $R^{33}$, $R^{34}$, $R^{35}$, $R^{36}$, $R^{37}$ and $R^{38}$ each independently represent:

optionally substituted $C_{1-24}$ alkyl;

optionally substituted $C_{1-24}$ aryl; it also being possible for $R^{32}$, $R^{33}$, $R^{34}$, $R^{35}$, $R^{36}$ and $R^{37}$ each independently to denote a hydrogen atom.

As examples of this first alternative form, the choice is made, as initiating-controlling compound, of a compound capable of providing at least one monofunctional radical (Z*) chosen from those of the formulae (IIIa$_1$), (IIIa$_2$) or (IIIa$_3$):

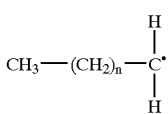
(IIIa$_1$)

where n=0 or an integer from 1 to 23 (mention may in particular be made of a hexyl radical (n=5));

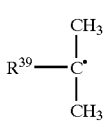
(IIIa$_2$)

where $R^{39}$ representing hydrogen, methyl or ethyl; and

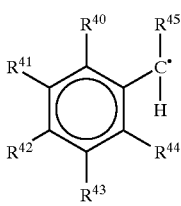
(IIIa$_3$)

with:

$R^{40}$, $R^{41}$, $R^{42}$, $R^{43}$ and $R^{44}$ each independently representing alkyl, aryl or halogen; and $R^{45}$ representing alkyl or aryl.

In particular, the choice may be made, as initiator-controller, of a compound of the formula (II) as defined above in which O* is replaced by O-alkyl, such as O-hexyl, or by O-styryl.

The choice may thus be made, as initiator-controller, of 1,2-dihydro-2,2-diphenyl-3-phenylimino-3H-indole N-oxyhexl.

The indoline nitroxides which constitute the (SFR*) radicals of the present invention and the corresponding initiators-controllers above are known compounds prepared according to procedures described in the literature. Reference will be made, for example, to Berti, C.; Colonna, M.; Greci, L.; Marcletti, L., *Tetrahedron*, 1975, 31, 1745;

Carloni, P.; Greci, L.; Stipa, P., *J. Org. Chem.*, 1991, 56, 4733–4737;

Albertini A.; Carloni, P.; Greci, L.; Stipa, P.; Neri, C., *Polym. Degrad. Stab.*, 1993, 39, 215–224;

Stipa P.; Greci, L.; Carloni, P.; Damiani E., *Polym. Degrad. Stab.*, 1997, 55, 323–327.

The ratio of the above initiating-controlling compound/monomer(s) is generally within the range from 0.0001% to 10% by weight, in particular in the range from 0.0005% to 5% by weight.

In accordance with a second alternative form, the choice is made, as initiating-controlling compound, of a compound capable of providing a radical (Z*) of formula (IV):

$$Z^1\text{-}(PM)^1\text{-}[(PM)^2]^*  \qquad (IV)$$

in which:

$Z^1$ represents the initiating fragment of a monofunctional radical initiator ($Z^{1*}$), such as the radical (Z*) defined above; and $(PM)^1$ represents a polymer block formed by living radical polymerization or copolymerization of at least one monomer which can polymerize by the radical route in the presence of an initiator which produces free radicals ($Z^{1*}$) and of at least one controlling free radical (SFR*) as defined above; and $(PM)^2$, the presence of which is optional, represents another polymer block, other than $(PM)^1$, formed by living radical polymerization or copolymerization of at least one monomer which can polymerize by the radical route in the presence of the initiator $[Z^1\text{-}(PM)^{1*}]$ and of at least one controlling free radical (SFR*) as defined above.

Mention may be made, as examples of $(PM)^1$ and $(PM)^2$ blocks, of those of the formulae:

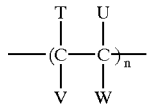

where:

T and U each independently represent hydrogen or a substituted or unsubstituted $C_{1-10}$ alkyl residue;

V and W each independently represent hydrogen, substituted or unsubstituted alkyl, substituted or unsubstituted aryl, —COOH, —COOR$^{46}$, —CN, —CONH$_2$, —CONHR$^{47}$, —CONR$^{48}$R$^{49}$,

or —OR$^{51}$, $R^{46}$ to $R^{51}$ each independently representing substituted or unsubstituted alkyl or substituted or unsubstituted aryl; and n denotes the degree of polymerization, which can in particular range up to 10,000.

This second alternative form thus relates to the use of macroinitiators-controllers, the "macroinitiator" part of which is prepared in a known way by living radical (co)polymerization under high pressure (for example>100 MPa), in the case where ethylene participates in the preparation of at least one of the blocks (T=U=V=W=H), or under low pressure, in the contrary case.

Furthermore, the (co)polymerization of the present invention is generally carried out under a pressure of 100 to 300 MPa, in particular of 150 to 250 MPa, and at a temperature of 100 to 300° C., in particular of 120 to 250° C.

There is no limitation with regard to the molecular masses of the (co)polymers obtained according to the invention. According to the polymerization or copolymerization conditions and in particular the duration, the temperature or the degree of conversion of monomer to polymer or copolymer, it is possible to prepare products of different molecular masses. In particular, in the case of the polymerization of ethylene, the process of the invention is carried out at a temperature, a pressure and a duration which are sufficient for the polyethylene obtained to have a weight-average molecular mass of greater than 70,000 and a number-average molecular mass of greater than 20,000 as polyethylene equivalent.

The process according to the invention can be carried out in the presence of a solvent. The solvent is chosen in particular from benzene, toluene, xylene, heptane, ethyl acetate, methanol, ethanol, propanol, isopropanol, butanol, isobutanol, amyl alcohol, dimethyl sulphoxide, glycol, dimethylformamide, tetrahydrofuran and their mixtures, the solvent/polymerization ingredients (namely monomer(s)+initiator and controller or initiator-controller) ratio by weight advantageously being at most 5.

The process according to the present invention can also be carried out in the presence of a transfer agent in the usual amounts. The transfer agents which can be used are well known to a person skilled in the art who is an expert in the (co)polymerization of ethylene under high pressure. Mention may in particular be made of alkanes, for example butane or heptane, alkenes, for example propylene, and oxygen-comprising derivatives, such as, for example, aldehydes or alcohols.

In accordance with the present invention, the ethylene can be copolymerized with any other monomer exhibiting a carbon-carbon double bond capable of polymerizing or copolymerizing by the radical route.

The monomer or monomers can thus be chosen from vinyl, allyl, vinylidene, diene and olefinic monomers (other than ethylene).

The term "vinyl monomers" is understood to mean in particular (meth)acrylates, vinylaromatic monomers, vinyl esters, vinyl ethers, (meth)acrylonitrile, (meth)acrylamide and mono- and di($C_1$–$C_{18}$ alkyl) (meth)acrylamides, and monoesters and diesters of maleic anhydride and of maleic acid.

The (meth)acrylates are in particular those of the formulae respectively:

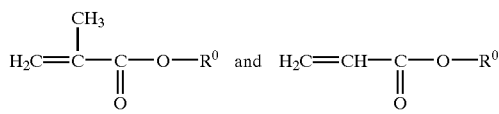

in which $R^0$ is chosen from $C_1$–$C_{18}$ alkyl radicals of linear or branched and primary, secondary or tertiary type, $C_5$–$C_{18}$ cycloalkyl radicals, ($C_1$–$C_{18}$) alkoxy ($C_1$–$C_{18}$)-alkyl radicals, ($C_1$–$C_{18}$) alkylthio ($C_1$–$C_{18}$) alkyl radicals, aryl radicals and arylalkyl radicals, these radicals optionally being substituted by at least one halogen atom and/or at least one hydroxyl group, the above alkyl groups being linear or branched; and glycidyl, norbornyl or isobornyl (meth) acrylates.

Mention may be made, as examples of useful methacrylates, of methyl, ethyl, 2,2,2-trifluoroethyl, n-propyl, isopropyl, n-butyl, sec-butyl, tert-butyl, n-amyl, i-amyl, n-hexyl, 2-ethylhexyl, cyclohexyl, octyl, i-octyl, nonyl, decyl, lauryl, stearyl, phenyl, benzyl, β-hydroxyethyl, isobornyl, hydroxypropyl or hydroxybutyl methacrylates. Mention may be made, in particular, of methyl methacrylate.

Mention may be made, as examples of acrylates of the above formula, of methyl, ethyl, n-propyl, isopropyl, n-butyl, sec-butyl, tert-butyl, hexyl, 2-ethylhexyl, isooctyl, 3,3,5-trimethylhexyl, nonyl, isodecyl, lauryl, octadecyl, cyclohexyl, phenyl, methoxymethyl, methoxyethyl, ethoxymethyl and ethoxyethyl acrylates.

The term "vinylaromatic monomer" is understood to mean, within the meaning of the present invention, an aromatic monomer comprising ethylenic unsaturation, such as styrene, vinyltoluene, α-methylstyrene, 4-methylstyrene, 3-methylstyrene, 4-methoxystyrene, 2-(hydroxymethyl)styrene, 4-ethylstyrene, 4-ethoxystyrene, 3,4-dimethylstyrene, styrenes substituted on the ring by a halogen, such as 2-chlorostyrene, 3-chlorostyrene, 4-chloro-3-methylstyrene, 3-(tert-butyl)styrene, 2,4-dichlorostyrene and 2,6-dichlorostyrene, 1-vinylnaphthalene and vinylanthracene.

Mention may be made, as vinyl esters, of vinyl acetate, vinyl propionate, vinyl chloride and vinyl fluoride and mention may be made, as vinyl ethers, of vinyl methyl ether and vinyl ethyl ether.

Mention is made, as vinylidene monomer, of vinylidene fluoride.

The term "diene monomer" is understood to mean a diene chosen from conjugated or nonconjugated and linear or cyclic dienes, such as, for example, butadiene, 2,3-dimethylbutadiene, isoprene, chloroprene, 1,3-pentadiene, 1,4-pentadiene, 1,4-hexadiene, 1,5-hexadiene, 1,9-decadiene, 5-methylene-2-norbornene, 5-vinyl-2-norbornene, 2-alkyl-2,5-norbornadienes, 5-ethylene-2-norbornene, 5-(2-propenyl)-2-norbornene, 5-(5-hexenyl)-2-norbornene, 1,5-cyclooctadiene, bicyclo[2.2.2]octa-2,5-diene, cyclopentadiene, 4,7,8,9-tetrahydroindene, isopropylidenetetrahydroindene and piperylene.

Mention may be made, as olefinic monomers, of olefins comprising from three to twenty carbon atoms and in particular the α-olefins of this group. Mention may be made, as olefin, of propylene, 1-butene, 4-methyl-1-pentene, 1-octene, 1-hexene, isobutylene, 3-methyl-1-pentene, 3-methyl-1-butene, 1-decene, 1-tetradecene or their mixtures. Fluorinated olefinic monomers may also be mentioned.

Mention may also be made, as (co)polymerizable monomers, of α- or β-ethylenically unsaturated $C_{3-8}$ carboxylic acids, such as maleic acid, fumaric acid, itaconic acid, acrylic acid, methacrylic acid and crotonic acid; or α- or β-ethylenically unsaturated carboxylic acid anhydrides, such as maleic anhydride or itaconic anhydride.

Preferred comonomers are, inter alia, vinyl acetate, n-butyl acrylate, 2-ethylhexyl acrylate, methyl acrylate, ethyl acrylate, glycidyl methacrylate, methyl methacrylate and maleic anhydride.

The proportion of the comonomers for the preparation of the random copolymers of ethylene is generally from 0 to 90% by weight, preferably from 0 to 50% by weight, of the total monomers.

The process according to the invention is carried out in a tubular reactor or autoclave or a combination of the two.

Autoclave and tubular processes are both included among the polymerization processes referred to as "high pressure" polymerization processes known to a person skilled in the art. These two processes involve the polymerization of ethylene by the radical route under high pressure, generally between 100 and 350 MPa, and at temperatures greater than the melting temperature of the polyethylene being formed. The tubular process involves polymerization in a tubular reactor. A tubular reactor comprises cylinders with an internal diameter generally of between 1 and 10 cm and a length generally ranging from 0.1 to 3 km. In a tubular reactor, the reaction mixture is driven with a high linear speed, generally of greater than 2 metres per second, and short reaction times which can, for example, be between 0.1 and 5 min.

The pressure in the tubular reactor can, for example, be between 200 and 350 MPa, preferably between 210 to 280 MPa, for example between 230 and 250 MPa. The temperature in the tubular reactor can range from 120 to 350° C. and preferably from 150 to 300° C.

The autoclave process involves polymerization in an autoclave with a length/diameter ratio generally ranging from 1 to 25, in the case of a single-zone reactor. In the case of a multiple-zone reactor, the length of each zone/diameter ratio generally ranges from 0.5 to 6, it being understood that the reaction mixture flows in the lengthwise direction.

The pressure in the autoclave reactor can, for example, be between 100 and 250 MPa, preferably between 120 and 180 MPa, for example between 140 and 170 MPa. The temperature in the autoclave reactor can range from 180 to 300° C., preferably from 240 to 290° C.

The present invention also relates to a homopolymer or a random copolymer of ethylene carrying, at one of its ends, the Z fragment resulting from an initiating radical (Z*) and, at its other end or along the chain, following a transfer reaction, an SFR fragment resulting from an indoline nitroxide radical (SFR*), as defined above.

It is known that the polymerization of ethylene results in transfer reactions related to the reactivity of the radical which has been propagated. For the homopolymerization of ethylene, two types of transfer reactions are generally distinguished:

intramolecular transfer (also known as back biting), resulting in short branches:

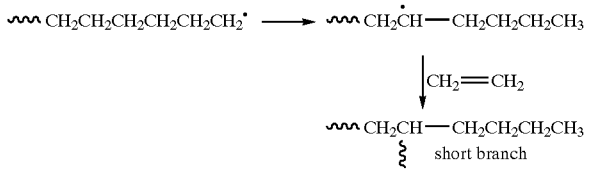

intermolecular transfer, resulting in long branches

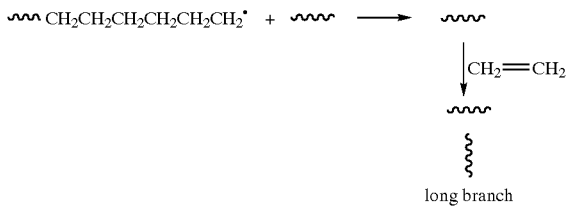

These reactions are also encountered in the copolymerization of ethylene with other monomers. The counterradical can thus become attached to the end of a long branch.

Thus, the invention also relates to block copolymers for which at least one of the blocks comprises ethylene as constituent, it being possible for the said block copolymer to be represented by the formula:

Z-(PM)$^1$-(PM)$^2$-(PM)$^3$-SFR in which:

Z denotes the initiating fragment resulting from a radical initiator;

(PM)$^1$, (PM)$^2$ and (PM)$^3$ represent three different polymer blocks formed by polymerization of at least one monomer which can polymerize by the radical route, (PM)$^2$ being optional;

SFR denotes the controlling fragment resulting from the controlling radical (SFR*) composed of an indoline nitroxide as defined above, it being possible for the said SFR fragment to be situated either at the end of the chain of the copolymer or along the chain of the polymer block (PM)$^3$ which carries it.

As already indicated above, these block copolymers are prepared by using the macroinitiators-controllers described above with reference to the second alternative.

The preparation of a block copolymer can be carried out in a single reactor or in several. If it is carried out in a single reactor, the second block will be obtained after injection of the monomer(s) into a separate zone from that which has been used to prepare the first block. It can also be carried out firstly under high pressure (P>100 MPa for example), when it is necessary to incorporate ethylene, and then the polymer resulting from this stage under high pressure can be used as macroinitiator for the preparation of the copolymer. This second operation can be carried out in any type of reactor operating at lower pressure (P<100 MPa, for example).

Mention may in particular be made of the block copolymers of the type:

Polystyrene-(b)-polyethylene

Polyacrylate-(b)-polyethylene

Polymethacrylate-(b)-polyethylene

Poly(styrene-(co)-acrylate)-(b)-polyethylene

Polystyrene-(b)-poly(ethylene-(co)-acrylate)

Polystyrene-(b)-poly(ethylene-(co)-vinyl acetate)

it being possible for such block copolymers, as well as the homopolymers of ethylene and the random copolymers obtained according to the invention, to have numerous applications as base for additives, for coextrusion binders, for films, for bituminous binders, for packaging, for moulded items, and the like.

Finally, the present invention relates to polymer compositions comprising a blend of at least one homopolymer or random copolymer of the invention and/or of at least one block copolymer of the invention and/or of at least one ethylene (co)polymer prepared by a conventional process (for example LDPE or HDPE), it being possible for these compositions to comprise at least one conventional additive.

The term "additive" is understood to mean any product which is used to modify the properties of the polymer. For example, in the formulation of hot melts, it is known that the properties of the base polymer are modified by the addition of resins or of oils which are used to introduce the required tack properties.

Comparative examples and nonlimiting examples describing the preparation of polymers as obtained according to the process of the present invention are given below. In these examples, the following abbreviations were used:

• TEMPO: 2,2,6,6-tetramethyl-1-piperidinyloxy

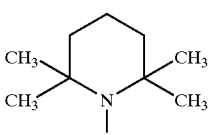

• Hexyl-TEMPO:

-continued

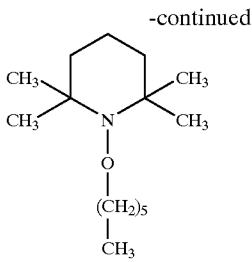

• 1,2-Dihydro-2,2-diphenyl-3-phenylimino-3H-indole N-oxyl, denoted in that which follows by the abbreviation CR1:

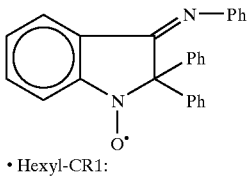

• Hexyl-CR1:

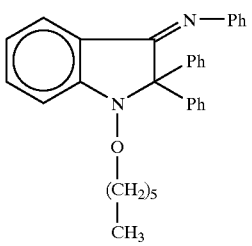

EXAMPLE 1 (Comparative)

Uncontrolled Polymerization of Ethylene at 200 MPa and 160° C. in the Presence of Hexyl-TEMPO A metal reactor, made of steel which is resistant to high pressure, is preheated using ring heaters to a temperature of 160° C. After purging several times with ethylene to 6 MPa and then 100 MPa, the reactor is charged with ethylene (19.2 g) and then, using a syringe, the following are injected into the reactor:

0.01626 g of hexyl-TEMPO (i.e. 103 molar ppm of free radicals with respect to the ethylene); and
0.804 g of heptane.

The pressure is subsequently increased to approximately 100 MPa, using a mechanical pump, and then to the desired value of 200 MPa, using a manual pump. The conversion is measured continuously using an infrared spectrometer connected to the reactor.

After 3 hours, the ethylene has not polymerized.

This is in agreement with the electron paramagnetic spectrometry measurements, which show that it is necessary to heat the hexyl-TEMPO beyond 200° C. to see the appearance of the TEMPO signal. In point of fact, the bond between the polyethylene chain and the TEMPO is of the same nature. It is therefore necessary to heat beyond 200° C. to be able to polymerize the ethylene.

EXAMPLE 2 (Invention)

Polymerization of Ethylene at 200 MPa and 160° C. with the Initiator-controller Hexyl-CR1

The operating conditions of Example 1 are repeated, except that 19.09 g of ethylene are used and that the 0.01626 g of hexyl-TEMPO is replaced by 0.03147 g of hexyl-CR1 (i.e. 101 molar ppm of free radicals with respect to the ethylene).

The control of the polymerization was evaluated using the ln(1/(1-conversion)) as a function of time curve, it being known that the control improves in proportion as the curve approaches linearity.

The following results over time were obtained:

| Time (min) | Conversion (%) | ln(1/(1 − conversion)) |
|---|---|---|
| 0 | 0 | 0 |
| 10 | 7 | 0.072 |
| 15 | 9.5 | 0.099 |
| 20 | 11.7 | 0.124 |

The plot of the semi-logarithmic ln(1/(1-conversion)) as a function of time curve is a straight line, which indicates good control of the polymerization. The correlation coefficient of this straight line is 0.99. Furthermore, comparison of Examples 1 and 2 shows that hexyl-CR1 provides a rate of polymerization of 0.6%/minute, whereas there is no polymerization (zero rate) with hexyl-TEMPO.

EXAMPLE 3 Invention

The experiment of Example 2 is repeated on several occasions but with different times, so as to be able to isolate polyethylene with different degrees of conversion.

The molecular masses of the polyethylenes were determined using steric exclusion chromatography, after dissolution of the polyethylene in trichlorobenzene at 145° C. The masses are expressed as polyethylene equivalent. The peak molecular mass is that determined at the moment of the chromatographic peak.

| Conversion (%) | Peak molecular mass (g/mol) | Polydispersity Mw/Mn |
|---|---|---|
| 0 | 0 | — |
| 7.2 | 75 000 | 3.67 |
| 14.8 | 95 000 | 5.53 |
| 18.3 | 150 000 | 6.25 |
| 37.8 | 250 000 | 7.39 |

It may be observed that the molecular mass increases linearly with the degree of conversion, the sign of a living polymerization. Furthermore, the masses observed are high, which is advantageous for the mechanical properties of the material.

It is found that the polydispersity index increases with the conversion, which is not necessarily a sign of a loss of control of the polymerization. This is because the index increases as a result of the intermolecular transfer reactions which persist even in the presence of counterradicals. Whereas U.S. Pat. No. 5,449,724 discloses ethylene (co) polymers with polydispersity indices of between 1.0 and 2.0, the present invention makes it possible to obtain polymers with higher indices, which can be beneficial for certain applications (manufacture of films, for example) or for having specific rheological characteristics.

It was not at all obvious that such a compound as hexyl-CR1 could polymerize ethylene with such a rate and with such good control.

EXAMPLE 4

Comparison of the Thermal Stability of the Nitroxide TEMPO and of the Nitroxide CR1

The thermal stability tests were carried out using a Bruker model EMX spectrometer equipped with a B-VT-2000 variable temperature unit from Bruker. The tests were carried out in diphenyl ether with a concentration of nitroxide of $5 \times 10^{-4}$ M. The diphenyl ether was passed beforehand over activated neutral alumina 90 and the samples were deoxygenated by several freezing-vacuum-defrosting cycles. The amount of solution used is approximately 500 microlitres per test. The sample is subsequently placed in the cavity of the spectrometer and then heated at 200° C. for 6 hours. The spectra are recorded every 5 minutes and the change in the concentration of nitroxide is determined by double integration of the EPR spectra. The reference integral is that corresponding to the first spectrum of the nitroxide at 200° C.

The results are recorded in the following Table:

| Time (h) | Amount of nitroxide remaining (expressed as %) | |
|---|---|---|
| | TEMPO | CR1 |
| 0 | 100 | 100 |
| 2 | 82 | 97 |
| 4 | 71 | 95 |
| 6 | 60 | 95 |

After 6 hours, only 60% of the TEMPO remains, whereas 95% of the indoline counter radical CR1 still remains. The rates of decomposition of the two species can also be compared:

TEMPO: 6.6%/hour
CR1: 0.83%/hour.

The CR1 is a more thermally stable counterradical.

What is claimed is:

1. Homopolymer or random copolymer of ethylene carrying,
    at one of its ends, a Z fragment resulting from an initiating radical (Z*) and,
    at its other end or along the polymer chain, a SFR fragment resulting from a controlling stable free radical (SFR*), said controlling free radical comprising an indoline nitroxide backbone represented by the formula (I):

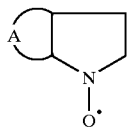

in which A is an aromatic ring including two carbon atoms which also form the nitrogenous ring, this ring A may carry substituent(s) or may carry one or more rings placed side by side, which rings are aromatic or aliphatic and optionally substituted, and the carbon atoms forming the nitrogenous ring in the alpha- and beta-position with respect to the nitrogen atom may carry hydrogen atoms or substituents.

2. Block copolymer for which at least one of the blocks comprises ethylene as constituent, wherein the block copolymer is represented by the formula:

Z-(PM)1-(PM)2-(PM)3-SFR in which:
    Z denotes an initiating fragment resulting from an initiating free radical;
    (PM)1, (PM)2 and (PM)3 represent three different polymer blocks formed by polymerization of at least one monomer which can polymerize by the radical route, (PM)2 being optional;
    SFR denotes a controlling fragment resulting from a controlling stable free radical (SFR*), said controlling free radical comprising an indoline nitroxide backbone represented by the formula (I):

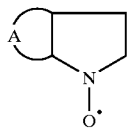

in which A is an aromatic ring including two carbon atoms which also form the nitrogenous ring, this ring A may carry substituent(s) or may carry one or more rings placed side by side, which rings are aromatic or aliphatic and optionally substituted, and the carbon atoms forming the nitrogenous ring in the alpha- and beta-position with respect to the nitrogen atom may carry hydrogen atoms or substituents, it being possible for the SFR fragment to be situated either at the end of the chain of the copolymer or along the chain of the polymer block (PM)3 which carries it.

3. Polymer compositions comprising a mixture of at least one homopolymer or random copolymer of ethylene carrying,
    at one of its ends, a Z fragment resulting from an initiating radical (Z*) and,
    at its other end or along the polymer chain, a SER fragment resulting from a radical (SER*), and/or of at least one block copolymer for which at least one of the blocks comprises ethylene as constituent, wherein the block copolymer is represented by the formula:

Z-(PM)1-(PM)2-(PM)3-SFR in which:
    Z denotes an initiating fragment resulting from an initiating free radical;
    (PM)1, (PM)2 and (PM)3 represent three different polymer blocks formed by polymerization of at least one monomer which can polymerize by the radical route, (PM)2 being optional;
    SFR denotes a controlling fragment resulting from a controlling stable free radical (SFR*), said controlling free radical comprising an indoline nitroxide backbone represented by the formula (I):

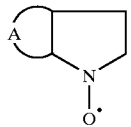

in which A is an aromatic ring including two carbon atoms which also form the nitrogenous ring, this ring A may carry substituent(s) or may carry one or more rings placed side by side, which rings are aromatic or aliphatic and optionally substituted, and the carbon atoms forming the nitrogenous ring in the alpha- and beta-position with respect to the nitrogen atom may carry hydrogen atoms or substituents, it being possible for the SFR fragment to be situated either at the end of the chain of the copolymer or along the chain of the polymer block (PM)3 which carries it.

* * * * *